(12) United States Patent
Williams et al.

(10) Patent No.: US 7,146,435 B2
(45) Date of Patent: Dec. 5, 2006

(54) DISTRIBUTION OF HARDWARE DEVICE INSTALLATION AND CONFIGURATION SOFTWARE

(75) Inventors: Brett J. Williams, Roseville, CA (US); Duane E. Mentze, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 10/703,675

(22) Filed: Nov. 7, 2003

(65) Prior Publication Data

US 2005/0102452 A1    May 12, 2005

(51) Int. Cl.
 G06F 3/00  (2006.01)
 G06F 13/00 (2006.01)
 G06F 13/10 (2006.01)
 G06F 13/14 (2006.01)
 G06F 3/01  (2006.01)

(52) U.S. Cl. ............... 710/8; 710/10; 710/15; 710/17

(58) Field of Classification Search ............ 710/8, 710/10, 15, 17
See application file for complete search history.

(56) References Cited

U.S. PATENT DOCUMENTS

| 6,023,585 | A  | * | 2/2000 | Perlman et al. ........... 717/178 |
| 2002/0062259 | A1 | * | 5/2002 | Katz et al. ............... 705/26 |
| 2002/0083227 | A1 | * | 6/2002 | Machida ................. 710/8 |
| 2002/0152336 | A1 | * | 10/2002 | Tso ...................... 710/8 |
| 2002/0161939 | A1 | * | 10/2002 | Kim et al. ............... 710/8 |

* cited by examiner

*Primary Examiner*—Kim Huynh
*Assistant Examiner*—Scott Sun

(57) ABSTRACT

In an embodiment of the invention, a method of distributing software, includes: browsing, by a hardware device, into a peripheral device that is connected to the hardware device via a medium that can be used to communicate with the hardware device by using a conventional protocol (e.g., HTTP over an Ethernet network); being redirected from the peripheral device to a backend system; providing peripheral device configuration information and hardware device install information to the backend system; and based upon the peripheral device configuration information and hardware device install information, distributing, from the backend system to the hardware device, hardware device installation and configuration software.

33 Claims, 3 Drawing Sheets

DISTRIBUTION OF HARDWARE DEVICE INSTALLATION AND CONFIGURATION SOFTWARE

TECHNICAL FIELD

Embodiments of the present invention relate generally to computer devices and software, and more particularly to the distribution of hardware device installation and configuration software.

BACKGROUND

Each peripheral device is typically provided with specific installation and configuration software. The client side configuration is currently performed outside of the context of communicating with the peripheral device. In other words, the installation and configuration software is first set up and then connected to the peripheral device.

Disparate installation and configuration technologies create customer confusion and dissatisfaction for particular products. Device specific client side software location and installation is a major problem for users.

Additionally, current installation/configuration technologies present difficulties in manufacturing. Since each device is shipped with a specific install/configuration solution, making changes to the solution has significant manufacturing cost implications. In contrast, by implementing an embodiment of the invention, the costs of updating the install/configuration solution can be significantly reduced.

Therefore, the current technology is limited in its capabilities and suffers from at least the above constraints or deficiencies.

SUMMARY OF EMBODIMENTS OF THE INVENTION

In an embodiment of the invention, a method of distributing software, includes: browsing, by a hardware device, into a peripheral device that is connected to the hardware device via a medium that can be used to communicate with the hardware device using a known protocol (such as, e.g., HTTP over an Ethernet network); being redirected from the peripheral device to a backend system; providing peripheral device configuration information and hardware device install information to the backend system; and based upon the peripheral device configuration information and hardware device install information, distributing, from the backend system to the hardware device, hardware device installation and configuration software. The hardware device may be a client device, while the backend system may be an Internet based web service. The peripheral device may be, for example, a printer, fax machine, copier, storage device, or other suitable devices.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
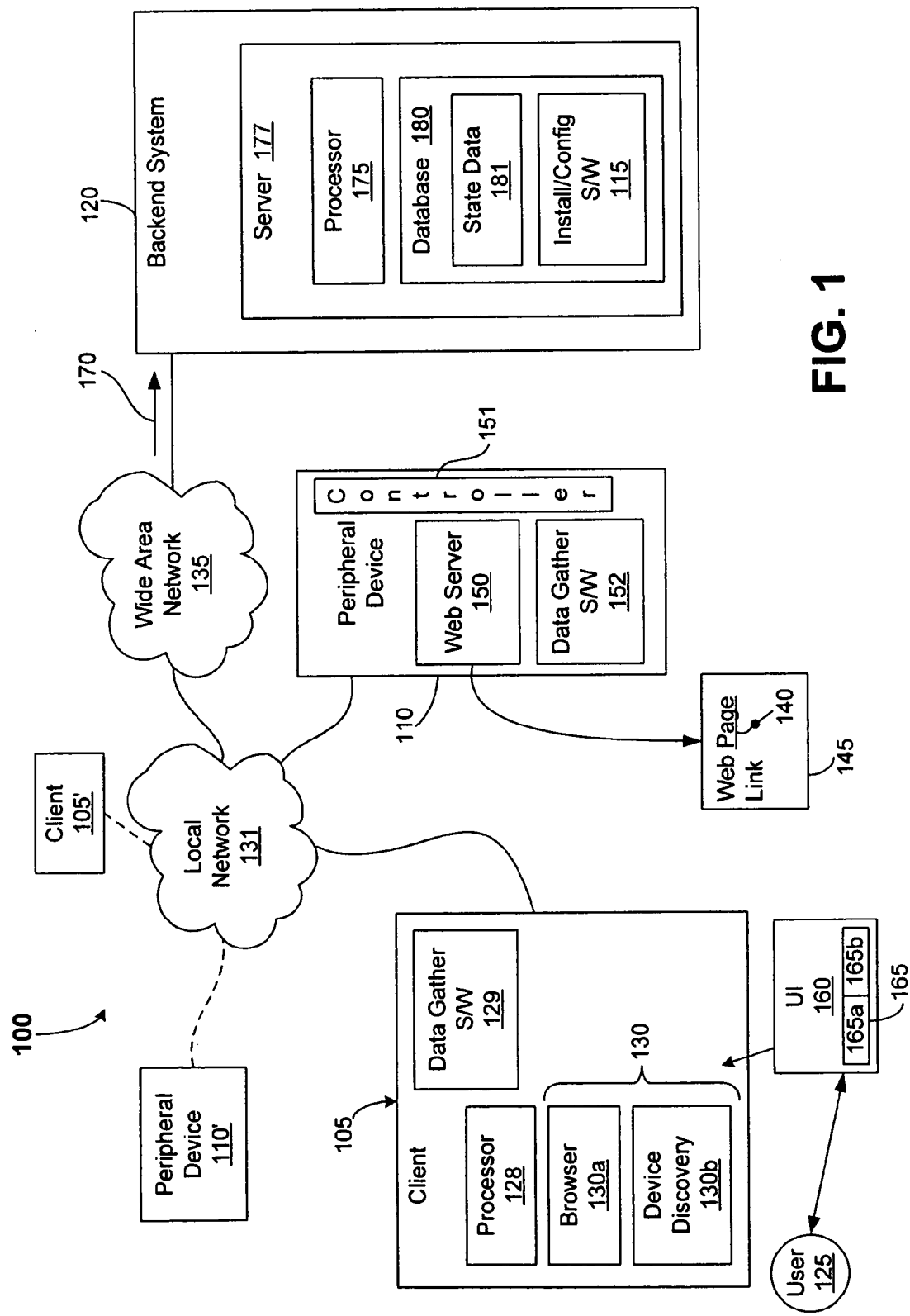
FIG. 1 is a block diagram of a network system that can implement an embodiment of the invention.

FIG. 1 is a block diagram of network system 100, in accordance with an embodiment of the invention. The network system 100 includes one or more client (or client device) 105, and one or more peripheral device 110 that can function with the client 105. An embodiment of the invention provides a generic install and configuration solution for clients 105 (or other hardware devices) and the peripheral devices 110 that need to interact with the hardware devices 105. The network system 100 permits the installation, on the client 105, of an installation and configuration (install/configure) software 115. The install/configure software 115 may also be referred to as a hardware device installation and configuration software 115. The install/configure software 115 is obtained from a backend system 120 that is associated with the peripheral device 110 and is based upon the peripheral device 110 configuration information and client (hardware device) 105 install information that are provided to the backend system 120. As an example, the install/configure software 115 is used to configure the peripheral device 110, to set up the connection (or communication path) between the client 105 and the peripheral device 110, and to permit the client 105 to interact with the peripheral device 110.

The peripheral device 110 is connected to the client 105 via a medium (local network) 131, where the medium 131 is used to permit communication with the client 105 by use of a conventional protocol such as, for example, HTTP (hypertext transfer protocol) over an Ethernet network. The local network 131 is typically a local area network (LAN) that is connected to the wide area network 135.

In previous approaches, the install/configure software 115 is provided in a compact disk (or other suitable computer readable storage medium), and the compact disk is then loaded into a disk drive of the client 105 to install the install/configure software 115 on the client 105. The install/configure software 115 is then used to configure the peripheral device 110 and to permit operations between the client 110 and the peripheral device 110.

In contrast, an embodiment of the invention provides the following method for distributing the install/configure software 115 from the backend system 120 to the client 105 via a network 135 which is typically a wide area network such as the Internet.

In one embodiment, a client application 130 is used to locate and access a peripheral device 110 that is connected to the local area network 131. A processor 128 in the client 105 is used to execute the client application 130. The user 125 browses to the peripheral device 110 by, for example, using the IP (Internet Protocol) address of the peripheral device 110. The client application 130 may be, for example, a web browser 130*a* and/or a device discovery software 130*b*. As an example, the user may input the IP address of the peripheral device 110 into the web browser 130*a*, in order to permit the client 105 to browse to the peripheral device 110. As another example, the device discovery software 130*b* may be used to discover any peripheral device 110 that is connected to the local network 131. A suitable device discovery software 130*b* is available from, for example, HEWLETT-PACKARD COMPANY. Device discovery can be performed by sending out a broadcast request or multicast request on the local network 131, and the peripheral device 110 can reply back to the device discovery software 130*b* to indicate its presence in the local network 131. When the user 125 selects or click on a discovered peripheral device 110, and the request from the client 105 is directed to the selected peripheral device 110 and forwarded to an appropriate backend system 120 via the wide area network 135. The device discovery software 130*b* eliminates the need for the user 125 to type the IP address of the peripheral device 110 into a browser 130*a*.

After the client 105 connects to the peripheral device 110, then the peripheral device 110 then redirects the user's application 130 (e.g., web browser 130*a*) to the Internet based backend system 120 (e.g., a web-service) by using standard Internet protocols, such as HTTP redirection. A web service is a standards based programmatic interface to services available to the public on the Internet or within an intranet. In an embodiment of the invention, the peripheral device 110 would automatically access this web service without requiring the user to enable the access with a click on a link.

Typically, the backend system 120 is an Internet based web service that is associated with the peripheral device 110. For example, the web service may be provided and operated by a manufacturer of the peripheral device 110.

In an alternative embodiment the peripheral device's embedded web site link 140 may allow the user 125 to select that link 140 that redirects the user's browser 130*a* to the backend system 120. In this alternative embodiment, the link 140 is typically embedded within a web page 145 that is served by a web server 150 of the peripheral device 110. The web page 145 is served to the browser 130*a* of the client 105.

As an example, in the alternative embodiment, the embedded web site link 140 may be an HTML (hypertext markup language) link. HTML has the advantage of allowing the user to click on the embedded Web site addresses within the link and be taken directly to the listed web site. The user 125 can select/click the link 140 so that the web browser 130*a* in the client 105 is directed to a backend system 120 that is associated with the peripheral device 110.

When the web browser 130*a* is directed to the backend system 120, the backend system 120 provides an install/configure user interface (UI) 160 that will be displayed on the client 105. The UI 160 may be, for example, a graphical user interface (GUI). In one embodiment of the invention, the user 125 can input the information 165 into the UI 160, where the information 165 relates to the peripheral device 110 and to the client 105. The information 165 may include peripheral device specific configuration information 165*a* and client specific install information 165*b*. (In another embodiment of the invention, some of this information 165 may be programmatically accessed and automatically seeded into the GUI 160. This information 165 is automatically gathered into the GUI 160 or passed in the GUI 165 by the processor 175 (FIG. 1) in the backend system 120, in order to minimize or eliminate the requirement for the user 125 to enter data into the GUI 160).

Figure 2:
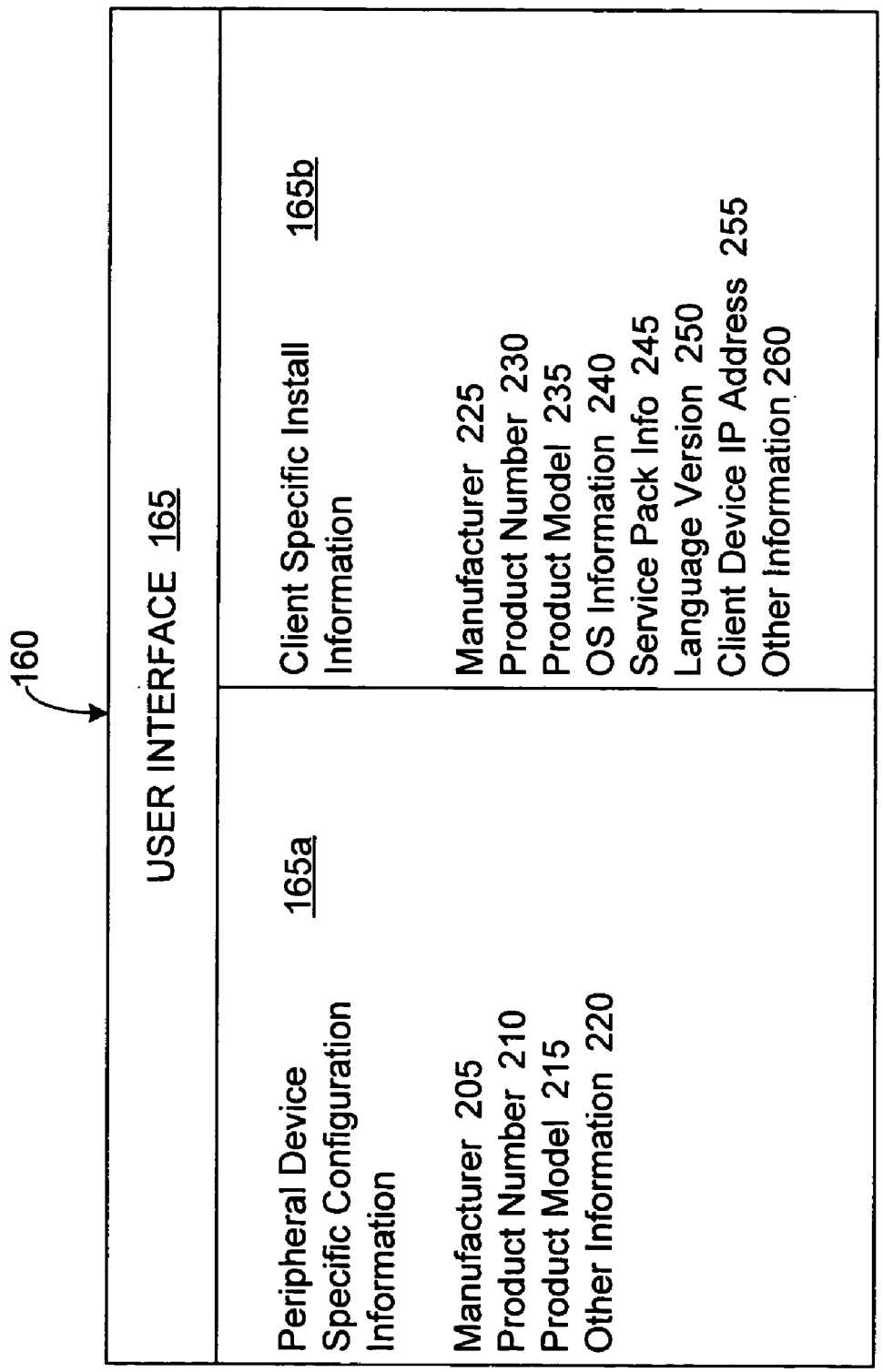
FIG. 2 is a block diagram of a generic peripheral device configuration user interface, in accordance with an embodiment of the invention.

As shown in FIG. 2, the peripheral device specific configuration information 165*a* may include, for example, at least one of the following information: manufacturer information 205, peripheral device product number 210 and/or model 215, and/or other information 220. The client specific install information 165*b* may include, for example, at least one of the following information: client manufacturer 225, client product number 230 and/or model 235, operating system and version 240, service pack information 245, language version 250, client device IP address 255, and/or other information 260. Typically, this information 165 may be programmatically accessed and automatically seeded into the GUI 160. Alternatively, this information may be provided (input) by the user 125 in, for example, text fields that are contained in the user interface 160 or may be objects that are selected by the user 125 in the user interface 160.

An embodiment of the invention provides the following multi-step process:

(1) When the user 125 browses into client device 105 and is redirected to the backend system web service 120, a base set 170 of information (FIG. 1) is sent to the backend system web service 120 from the client 105 and peripheral device 110.

(2) The base set of information 170 is used by the web service 120 to determine what type of installation/configuration software 115 needs to be used.

(3) The software 115 is downloaded to the client 105 and preconfigured with system information.

(4) The software 115 is started.

In the client 105, the processor 128 can execute a data gather software 129 which gathers the client specific install information 165*b* (which is associated with the client 105). The data gather software 129 places the gathered client specific install information 165 in the base set 170, and then transmits the base set 170 as a packet to the peripheral device 110 by use of a standard packet transmission protocol.

In the peripheral device 110, a controller 151 (or processor 151 in some cases) can execute a data gather software 152 which gathers the peripheral device specific configuration information 165*a* (which is associated with the peripheral device 110). The data gather software 152 adds the gathered peripheral device specific configuration information 165*a* to the base set 170, and then transmits the base set 170 to the backend system 120 by use of a standard packet transmission protocol.

In an embodiment of the invention, the user interface 160 is a generic GUI that provides a common look and feel and the user interface 160 would be provided as a web service by the backend system 120.

The backend system 120 is tailored to the peripheral device 110 and may use XML (Extensible Markup Language) to pass a peripheral device specific data to the client 105. This peripheral device specific data can include the install/configure software 115. As known to those skilled in the art, XML permits a flexible way to create common information formats and share both the format and data on the Internet, Intranets, and elsewhere. The interaction between the client 105 and the backend system 120 may be based upon conventional web service standards that are based on XML.

The backend system 120 displays the UI 160 through the user's web browser 130a and gathers the appropriate peripheral device specific configuration 165a or/and client specific install information 165b.

The peripheral device specific configuration 165a and/or the client specific install information 165b are then used by the backend system 120 to determine if any client side software 115 (e.g., the install/configure software 115) is needed for actual use of the peripheral device 110. The client side software 115 could include, for example, a driver or port monitor that is used for the particular peripheral device. For example, if the peripheral device 110 is a printer, then the client side software 115 may include the print driver, driver information, and/or an installer.

It is noted that the peripheral device 110 is not limited to a printer. Other suitable peripheral devices may be used, such as fax machines, copiers, storage devices, and/or other types of devices. These other types of peripheral devices 110 may require particular client side software 115 that are downloaded from the backend system 120 to the client 105.

In an embodiment, the backend system 120 determines the appropriate software 115 for the client 105 by using a processor 175 (in a server 177) that compares the peripheral device specific configuration 165a and/or the client specific install information 165b with state information 181 in a backend system database 180. Based on this comparison, the processor 175 can determine the necessary client side software 115 that will need to be downloaded to the client 105 via wide area network 135. The backend system database 180 will contain the peripheral device specific state data 181 provided by the developer(s) of the peripheral device 110. The client side software 115 is downloaded by the server 177 (in the backend system 120) to the client 105 by using the IP address information 255 of the client 105. Any necessary client side software 115 is typically provided by the developer/manufacturer of the peripheral device 115 and is available through this backend system database 180.

The download and install of any client side software 115 is handled by the backend system 120. Any device configuration may also be handled by the backend system 120. Communication mechanisms can be negotiated at run time and passed via XML data.

The network system 100 also typically includes other components that are known and are used for permitting functions in a communication network. For purposes of focusing on the embodiments of the invention, these other known components are not shown in FIG. 1.

In an embodiment, a client 105 is typically a computer (e.g., personal computer) that execute under the control of an operating system, such as the WINDOWS operating system from MICROSOFT CORPORATION. However, those skilled in the art will recognize that a client 105 may be any suitable type of computer such as, for example, a laptop, notebook, palmtop, server, workstation, mainframe, minicomputer, or other types of computing devices or hardware devices, and the operating system may be any suitable operating system, such as, for example, OS/2, OS/390, MACINTOSH, UNIX, LINUX, or other types of operating system software. The operating system and other software or firmware in a client 105 are executed by the processor 128 in the client 105.

As also mentioned above, the peripheral device 110 may be any suitable network peripheral device. Additionally, more than one peripheral device 110 may be installed in the local network 131. More than one client 105 may obtain the client side software 115 for any particular peripheral device 110. For example, assume that a second peripheral device 110' is installed into the local network 131. The client 105 can browse into this second peripheral device 110' and is directed into an appropriate backend system so that the suitable install/configure client side software 115 may be downloaded to the client 105. The appropriate backend system may be the backend system 120 if the backend system 120 is associated with the second peripheral device 110'. Similarly, a second client 105' may be installed into the local network 131 and may browse the peripheral device 110 and/or peripheral device 110' in order to obtain the suitable install/configure client side software 115.

Various known components and modules that permit a user 125 to use a client 105 and to permit the client 105 to interface in the network system 100 are not shown in FIG. 1 for purposes of describing a functionality of embodiments of the invention.

An advantage of embodiments of the invention is that installation and configuration (of client side software 115 that is needed for interaction with a peripheral device 110) is no longer a client centric model. In other words, an embodiment of the invention permits the client side software 115 to be obtained by interacting with the peripheral device 110 that is selected by the user 125. As such, an embodiment of the invention provides a peripheral device centric model for obtaining the install/configure client side software 115 for clients 105 and for configuring and enabling the peripheral device 110.

An embodiment of the invention also provides a common look and feel user interface 160 for the peripheral device install and configuration software 115, regardless of the type of peripheral device 110 that the user 125 is working with.

An embodiment of the invention also provides a central point to release bug fixes in the install/configure client side software 115. The backend system 120 can serve as this central point for releasing the bug fixes.

It should be appreciated that, in alternative embodiments, the network system 100 may include components and products other than those discussed above. Moreover, the network system 100 can be implemented on different operating systems and hardware. Printers having printing capabilities different from the disclosed printers may be used. Further, in alternative embodiments, any number of clients (hardware devices) having alternative user interfaces may be used. Those skilled in the art will recognize that other alternative hardware and software environments may be used without departing from the scope of embodiments of the invention. As such, the exemplary environment in FIG. 1 is not intended to limit embodiments of the invention.

Figure 3:
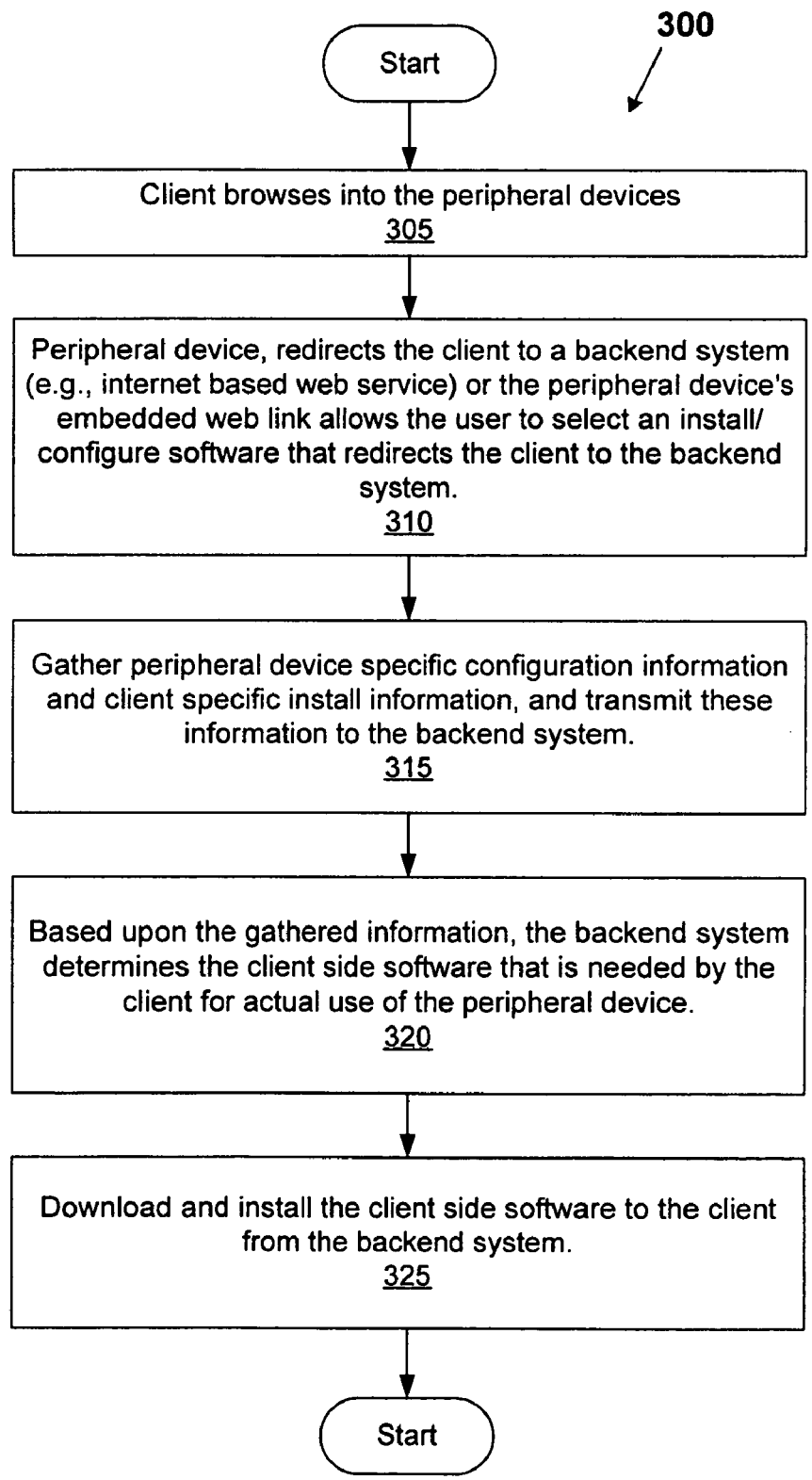
FIG. 3 is a flowchart of a method in accordance with an embodiment of the invention.

FIG. 3 is a flowchart of a method 300 in accordance with an embodiment of the invention. A client (or other hardware device) browses (305) into a peripheral device. In step (310), the peripheral device then redirects the client to a backend system (e.g., an Internet based web service) or the peripheral device's embedded web link allows the user to select an appropriate install/configure software that redirects the client to the backend system.

In step (315), the peripheral device automatically gathers the appropriate peripheral device specific configuration information and the client automatically gathers the client specific install information, and these information are transmitted to the backend system.

Based upon the gathered peripheral device specific configuration information and client specific install information in step (315), the backend system determines (320) the client side software that is needed by the client for actual use of the peripheral device.

In step (325), the client side software is downloaded and installed to the client from the backend system. Thus, step (325) involves the distribution of the hardware device installation and configuration software 115 from the backend system to the client. Step (325) also involves the initializing and installing of the hardware device installation and configuration software on the client, in order to permit the client to interact with the peripheral device.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of distributing software, the method comprising:
    providing a hardware device, peripheral device, backend system, local area network, and wide area network, where the hardware device and peripheral device are both connected to the local area network, and the local area network and the backend system are both connected to the wide area network;
    sending a single request from the hardware device to the peripheral device, including browsing, by the hardware device, into a peripheral device that is connected to the hardware device;
    re-directing the single request so that the single request is sent from the peripheral device to the backend system and so that the single request is not sent back to the hardware device from the peripheral device;
    providing peripheral device configuration information and hardware device install information to the backend system, wherein the single request includes the peripheral device configuration information and hardware device install information; and
    based upon the peripheral device configuration information and hardware device install information in the single request, distributing, from the backend system to the hardware device, hardware device installation and configuration software.

2. The method of claim 1, wherein the hardware device comprises a client device.

3. The method of claim 1, wherein the backend system is associated with the peripheral device.

4. The method of claim 1, wherein the peripheral device comprises one of a printer, fax machine, copier, or storage device.

5. The method of claim 1, wherein the hardware device browses into the peripheral device based upon an Internet Protocol address of the peripheral device.

6. The method of claim 1, wherein the backend system provides a user interface.

7. The method of claim 1, wherein Extensible Markup Language (XML) is used to pass data between the hardware device and the backend system.

8. The method of claim 1, wherein peripheral device configuration information and hardware device install information in the single request is compared with state data in the backend system to determine the hardware device installation and configuration software that will be downloaded by the backend system to the hardware device.

9. The method of claim 1, further comprising:
    initializing and installing the hardware device installation and configuration software on the hardware device, in order to permit the hardware device to interact with the peripheral device.

10. The method of claim 6, wherein the user interface comprises a graphical user interface.

11. An apparatus for distributing software, the apparatus comprising:
    a client;
    a peripheral device;
    a backend system;

a local area network, and wide area network, where the client and peripheral device are both connected to the local area network, and the local area network and the backend system are both connected to the wide area network; and wherein the client is configured to send a single request to the peripheral device, and to browse into the peripheral device;

wherein the single request is sent from the client to the peripheral device and the single request is then re-directed so that the single request is sent from the peripheral device to the backend system and so that the single request is not sent back to the client from the peripheral device, and the single request includes peripheral device configuration information and hardware device install information;

wherein based upon peripheral device configuration information and hardware device install information in the single request that is provided to the backend system, the backend system distributes hardware device installation and configuration software to the hardware device.

12. The apparatus of claim 11, wherein the hardware device comprises a client device.

13. The apparatus of claim 11, wherein the backend system is associated with the peripheral device.

14. The apparatus of claim 11, wherein the peripheral device comprises one of a printer, fax machine, copier, or storage device.

15. The apparatus of claim 11, wherein the hardware device browses into the peripheral device based upon an Internet Protocol address of the peripheral device.

16. The apparatus of claim 11, wherein the backend system provides a user interface.

17. The apparatus of claim 11, wherein Extensible Markup Language (XML) is used to pass data between the hardware device and the backend system.

18. The apparatus of claim 11, wherein peripheral device configuration information and hardware device install information in the single request is compared with state data in the backend system to determine the hardware device installation and configuration software that will be downloaded from the backend system to the hardware device.

19. The apparatus of claim 11, wherein the hardware device initializes and installs the hardware device installation and configuration software on the hardware device, in order to permit the hardware device to interact with the peripheral device.

20. The apparatus of claim 16, wherein the user interface comprises a graphical user interface.

21. The apparatus of claim 16, wherein the user interface provides a common look and feel.

22. The apparatus of claim 11, wherein the backend system includes a database configured to store the hardware device installation and configuration software.

23. An apparatus for distributing software, the apparatus comprising:
a hardware device;
a peripheral device;
a backend system;
a local area network, and wide area network, where the hardware device and peripheral device are both connected to the local area network, and the local area network and the backend system are both connected to the wide area network;

means for sending a single request from the hardware device to the peripheral device, including means for browsing, by a hardware device, into a peripheral device;

means for redirecting the single request so that the single request is sent from the peripheral device to the backend system and so that the single request is not sent back to the hardware device from the peripheral device;

means for providing peripheral device configuration information and hardware device install information to the backend system, wherein the single request includes the peripheral device configuration information and hardware device install information; and means for distributing, from the backend system to the hardware device, hardware device installation and configuration software, based upon the peripheral device configuration information and hardware device install information.

24. The method of claim 1, further comprising:
using a web browser in the hardware device to connect to the internet protocol address of the peripheral device.

25. The method of claim 1, further comprising:
using a device discovery software to discover the peripheral device.

26. The method of claim 1, further comprising:
using a first data gather software in the hardware device to place the hardware device install information into the single request, prior to sending the single request from the hardware device to the peripheral device.

27. The method of claim 1, further comprising:
using a second data gather software in the peripheral device to add the peripheral device specific configuration into the single request, prior to re-directing the single request from the peripheral device to the backend system.

28. The apparatus of claim 11, wherein the client includes a web browser that permits connection to the internet protocol address of the peripheral device.

29. The apparatus of claim 12, wherein the client includes a device discovery software for discovering the peripheral device.

30. The apparatus of claim 11, wherein the client includes a first data gather software that places the hardware device install information into the single request, prior to sending the single request from the client to the peripheral device.

31. The apparatus of claim 11, wherein the peripheral device includes a second data gather software that adds the peripheral device specific configuration into the single request, prior to re-directing the single request from the peripheral device to the backend system.

32. The apparatus of claim 23, wherein the hardware device includes a first data gather software that places the hardware device install information into the single request, prior to sending the single request from the client to the peripheral device.

33. The apparatus of claim 23, wherein the peripheral device includes a second data gather software that adds the peripheral device specific configuration into the single request, prior to re-directing the single request from the peripheral device to the backend system.

* * * * *

UNITED STATES PATENT AND TRADEMARK OFFICE
CERTIFICATE OF CORRECTION

| | | |
|---|---|---|
| PATENT NO. | : 7,146,435 B2 | Page 1 of 1 |
| APPLICATION NO. | : 10/703675 | |
| DATED | : December 5, 2006 | |
| INVENTOR(S) | : Brett J. Williams et al. | |

It is certified that error appears in the above-identified patent and that said Letters Patent is hereby corrected as shown below:

In column 10, line 41, in Claim 29, delete "claim 12," and insert -- claim 11, --, therefor.

Signed and Sealed this
Twenty-eighth Day of February, 2012

David J. Kappos
*Director of the United States Patent and Trademark Office*